Patented Oct. 14, 1924.

1,511,808

UNITED STATES PATENT OFFICE.

GEORGE GRINDROD, OF OCONOMOWOC, WISCONSIN, ASSIGNOR TO CARNATION MILK PRODUCTS COMPANY, OF OCONOMOWOC, WISCONSIN, A CORPORATION OF DELAWARE.

MODIFIED MILK AND PROCESS FOR MAKING THE SAME.

No Drawing. Application filed January 17, 1920. Serial No. 352,184.

*To all whom it may concern:*

Be it known that I, GEORGE GRINDROD, citizen of the United States, and resident of Oconomowoc, county of Waukesha, State of Wisconsin, have invented certain new and useful Modified Milks and Processes for Making the Same, of which the following is a specification.

This invention relates to modified milks or what is known as artificial human or mothers' milk and processes for making the same.

Heretofore, various forms of modified milk have been proposed, but none of these have successfully accomplished the object for which they were intended. Among the modified milk heretofore proposed, some were modified to some extent in fat and sugar content only, but were not modified in ash content. Such products would not keep for a sufficient length of time to permit successful marketing, and in general did not meet the requirements. Furthermore, such milks were subject to crystallization of lactose, fat separation, spoiling by spore-forming bacteria on account of incomplete sterilization, and were subject also to spontaneous decomposition of the protein, due to chemical changes not initiated by bacteria. Such modified milks, as heretofore proposed, were also subject to separation of the colloid aggregate from the milk serum. Other than these unsuccessful efforts, no one has attempted to produce an equivalent of human milk from cows' milk in such a combination as to permit condensation, canning and sterilizing, in a manner to keep indefinitely.

As stated, condensed modified or humanized milk, has heretofore been found to undergo slow separation and decomposition of the protein even when sterilized. Numerous investigations and tests made by me caused me to conclude that one reason for this was the catalytic action of the inorganic salts of the milk, which are in increased concentration in a condensed product. When additional crude lactose or whey was added, as was done in some of the products heretofore proposed, the inorganic salts of the lactose further increased the concentration of such salts and accelerated the decomposition of proteins. To prove this, I prepared a quantity of inorganic salts of milk and added them to condensed modified milk in varying proportions, and I found that the rate of spontaneous decomposition varies directly as the proportion of inorganic salts present. Impurities in the lactose tend further to cause decomposition at a rate greater than the proportion of impurities would indicate, because such impurities are generally in a crystalline state, or if of protein nature then in a coagulated state, thus offering centers or nuclei on which coagulation of the milk protein starts.

Furthermore, in certain condensed modified milks, heretofore made, a settling out of serum at the bottom of the container took place, as the colloids were not in stable suspension and together with the fat which they entangled would rise to the upper part of the container and allow the serum to separate to the bottom. This separation of the colloid aggregate, that is, the colloidal constituents and the fat entangled therewith, has been heretofore attributed to lack of proper combination of the constituents. The inability to separate milk into its constituents, and recombine them in other proportions and make a stable compound, has heretofore been one of the chief difficulties in the way of making a permanent or stable humanized milk which could be condensed.

Evaporated cows' milk is well known to be a stable product, keeping in cans without separation of fat or serum, for years. But while the first attempts at condensing, canning and sterilizing humanized milk were begun at about the same time that the process of making evaporated sterilized cows' milk was discovered, there is as yet no evaporated sterilized humanized milk on the market. Condensed humanized milk has never been found to keep uniformly but separates into a layer of serum and a layer of fat-portein.

This tendency of condensed humanized milk to separate was thought by early inventors in this art to be due to lack of homogenizing, but with the invention and use of homogenizing machines, the separation was found to continue as before, and homogenizing, although a well known process for many years, has not resulted in the production of a condensed humanized milk as a stable marketable commercial article.

I have fully investigated the cause of this marked difference between the stability of evaporated cows' milk and evaporated humanized milk and have found the cause and remedy for lack of stability in evaporated humanized milk to be as follows:

Upon subjecting stable, evaporated cows' milk to a process of ultrafiltration, I succeeded in separating it directly into two parts, (a) a clear serum containing only 0.25% protein, all the lactose and inorganic salts, and (b), the colloids and the fat.

Since an ultrafilter of any type is a filter capable of separating crystalloids from colloids, this method indicates that in the process of condensing and sterilizing the proteins of milk are thrown completely into the colloidal state, with the exception of a residual 0.25%, which, according to my results, appears to be a constant non-colloidal constituent.

I determined the specific gravity of the clear serum from evaporated milks known to be stable, and found in all cases a serum specific gravity equal to or slightly less than the specific gravity of the colloid aggregate. Since it has long been known in the evaporated milk industry that the most stable product is obtained at a concentration of 2¼ to 1, I concluded that this particular concentration found by experience, is the point at which the serum specific gravity equals that of the colloid aggregate, in cows' milk. Since the specific gravity of the colloid aggregate is constant regardless of concentration and that of the serum increases with concentration there is a point, and only one point of concentration, for any given composition of milk at which the specific gravity of the serum equals the specific gravity of the colloid aggregate. At this point, an inseparable stable product is obtained.

I obtain samples of condensed sterilized humanized milk which had separated after being placed on the market, and subjected them to the same process of ultrafiltration and found that in them, the serum was decidedly heavier than the colloid aggregate, thus accounting for their lack of stability.

I next made condensed humanized milk by the process herein described, determining the point of concentration, producing stability by the method hereinafter described, and found the product to be stable against separation for a period of one year, and apparently indefinitely stable.

These investigations have shown that (1) the density of a humanized milk must be in accord with its composition, (2) the point of concentration is different from that of evaporated cows' milk, (3) the point of concentration must be determined and is an essential to the manufacture of a stable product, (4) an adaptation of the principle of ultrafiltration is a successful method for the control of manufacture.

The method and apparatus employed in applying the principles of ultrafiltration for the purpose above referred to are distinct from the method and apparatus heretofore used, although the principle remains the same, ultrafiltration being understood to mean specifically the separation of crystalloids from colloids by filtration. Ultrafiltration has heretofore been carried out as follows:

A pure heavy cellulose filter paper has been caused to gelatinize by means of sulphuric acid of approximately 66% at a temperature of approximately 15° centigrade, thus producing amyloid. The filter paper was by this means rendered semi-permeable and capable of separating crystalloids from colloids by direct filtration if sufficient pressure were placed on the liquid to be filtered. On account of the clogging of the pores of such a membrane, however, only minute quantities of the liquid could be filtered, and then only liquids of very low viscosity, such as dilute solutions. This method has heretofore been used in laboratory research only and for the qualitative separation of dilute materials.

It is evident that such a process as this could not be industrially applied because the process is too inefficient. It would be impossible to secure sufficiently rapid filtration, and it would furthermore be entirely impossible to filter such a thick liquid as milk.

Having observed the power of infusorial earth to adsorb proteins and to separate colloids of different sizes from crystalloids, I concluded that infusorial earth could be utilized in place of the amyloid membrane for the purpose of ultrafiltration. I, accordingly, mixed with the milk to be filtered, using a quantity of 200 to 500 ccs., sufficient infusorial earth to form a thick paste and then subjected this paste to a heavy hydrostatic pressure in a specially constructed funnel, using a rubber membrane to separate the paste from the water. By this means I was able to separate a clear serum from the milk instantly and to filter any desired quantity of the milk. The infusorial earth on the application of pressure settles into a compact mass having a porosity such that colloid particles cannot pass through it, and at the same time offering a very large area in which to retain the gelatinous colloids. Instead of a thin amyloid membrane, the filter prepared in this way may be from two centimeters to five centimeters thick. Frequently, the first few cubic centimeters passing from the filter will contain some colloids, but as soon as the infusorial earth forms a layer a few millimeters in thickness, the colloids cease to pass and an apparently clear serum is removed from the milk. This process instead of requiring several hours, as in processes of ultrafiltration heretofore used, requires only a few minutes and so is adaptable to the manufacture of the present product.

After the separation of the non-colloid serum from a sample of the milk, its specific gravity is accurately determined, and from the specific gravity of the serum and the specific gravity of the original milk, the specific gravity of the colloid aggregate may be calculated it being unnecessary to separately determine the specific gravity of the colloid aggregate.

Having determined the specific gravity of the colloid aggregate of a given composition of milk, the extent of concentration required to produce stability may be calculated. Thus, if the specific gravity of the colloid aggregate is found to be, for example 1.07 and the specific gravity of the serum from the uncondensed milk is found to be 1.04, the extent of concentration required is the ratio of 7 to 4. When the entire milk is condensed in this ratio the specific gravity of the serum will then be 1.07, or identical with that of the colloid aggregate and consequently the colloid aggregate cannot separate from the serum. In practice, condensation is carried slightly past the calculated point, the condensate then analyzed and specific gravity determined after which a small amount of water is added to bring the specific gravity of the milk to the exact point required.

For any particular proportion of fat, protein and lactose in modified milk there must be a certain point of concentration at which the density of the serum equals the density of fat protein entanglement, and this is the point to which the particular composition in question must be condensed in order to be in stable suspension. The serum may have a slightly less specific gravity than a fat protein entanglement without danger of separation. In practical manufacture a certain margin of variation must always be allowed in order to make the process practical, and certain variation in condensation is permissible in this product. Such variation as occurs in the manufacture of a condensed modified milk must be so regulated that the specific gravity of the serum does not exceed the specific gravity of the colloidal aggregate. But the specific gravity of the colloidal aggregate may slightly exceed the specific gravity of the serum without resulting in serious separation.

The composition of human milk is not fixed and definite, but varies considerably, and the composition instead of being a fixed percentage of the several constituents, is in fact a range of percentage or proportion for each constituent. If the ratio between the three principal constituents, namely, fat, protein and lactose, is varied, the point of condensation must also be varied. It is desirable to manufacture a product which is condensed either in the ratio of two to one, or in some other even ratio, and it is therefore advisable to modify the proportions of the constituents slightly in order to make the point of stability occur at some even ratio of concentration. A range of permissible variation from the point of theoretical stability is practically the same as that allowable in evaporated milk. Roughly the fat may vary a few tenths of a per cent one way or the other without resulting in separation, and the same is true of the other constituents.

I have found that the modified milk having a composition of 7% butter fat, 5% protein and 12% lactose is stable. This is substantially a two to one concentration of human milk having an original composition of 3.5% fat, 2.5% protein and 6% lactose. If the percentage of fat is increased above 7% by any appreciable amount, the percentage of protein must also be increased. If the percentage of lactose is increased the percentage of protein must be increased. If the percentage of lactose is decreased the percentage of fat may be increased, or the protein may be decreased. It might, therefore, be said that in general, a modified human milk which is stable must have compositions approximately within the following ranges: fat 7% to 9%, protein 4.5% to 5.6%, lactose 11% to 14%. If the composition is varied materially outside any of these ranges the milk is no longer of average human milk composition. It is obvious that it would be practicable to lower the lactose, increase the protein, and increase the fat, approaching the composition of cows' milk and at the same time maintain a stable composition, but percentages out of the ranges specified vary too much from those of human milk to make the product suitable for infant feeding. Points of stability at suitable concentration can be found within the ranges specified, thus keeping the composition within the range of average human milk and at the same time so balancing the contituents as to make the product stable.

Furthermore, attempts at sterilization of condensed humanized milk have resulted in variable success, some batches withstanding sterilization, while others of apparently the same composition coagulated in the process.

In general, humanized milk has been found difficult, if not impossible to sterilize if condensed, since the protein will coagulate before a sterilizing temperature can be reached, it being necessary to sterilize any canned milk product at a temperature not less than 233° F. for thirty minutes or the equivalent, which is the death point of a spore former heretofore called Paraplectum foetidium (Bjrinck), or Plectridium foetidium (Hunziker), but now known to be a variety B. butyricus.

A higher temperature, or a longer time of sterilization than 233° F. for 30 minutes has been found necessary in the eastern and central parts of the United States. On the Pacific coast in my experience 233° F. for 30 minutes was sufficient to kill the spore-forming bacteria but in central and eastern United States a more resistant strain of the B. butyricus has been found, and also more resistant bacteria of other species. In these districts it has therefore been necessary to sterilize milk for not less than 16 minutes at 242°, or 40 minutes at 233°. The former treatment using a higher temperature has been found more safe and certain of sterilization than the lower temperature.

Prior inventors in this art, for example, Trudel, Patent No. 1,039,849, have thought that variable coagulability is due to acidity and have fixed limitations of acidity permissible. But I have found acidity to be a minor factor in determining coagulability of humanized milk, the principal cause of the variable coagulation being due to the presence of abnormal proteins in the original milk. I have found that all cows do not give sufficiently normal milk for the production of humanized milk, and that diseases and inflammations of the milk tract also cause abnormal coagulable proteins.

In order to detect abnormal proteins as well as other causes of coagulation, such as acidity, I have devised a new test which is essential in the grading and selection of milk to be humanized.

The test referred to has become known as the heat test and is based on the following principles:

In practice, the test is carried out under conditions necessary to the selection of a milk capable of withstanding sterilizing after its evaporation at a temperature of 233° F. for thirty minutes, or the equivalent of this amount of time and heat in any other combination of time and temperature.

The coagulation of the proteins of milk through the agency of heat is known to have a relationship to the inorganic salts of the milk, and the coagulation is known to be greatly facilitated by increases in certain inorganic salts. I have, accordingly, fully investigated the relationship of the inorganic salts of the milk and the coagulability of the proteins and have found that the calcium citrate is chiefly responsible for the coagulation of proteins which are normal. I have also found that with a particular sample of milk having a fixed inorganic salt content, the coagulability follows the laws of catalysis, and the inorganic salts, especially the calcium citrate, appear to be the catalytic agents causing the coagulation. Accordingly, the coagulation of the protein in a sample of milk having a given content of inorganic salt varies as the time to which the sample is exposed to a given temperature. I have also found that if the inorganic salt content is varied, as for instance, by diluting the milk with pure water, or by concentrating the milk by evaporation in a vacuum, the rate of coagulability increases as the salt content increases, or decreases as the salt content decreases, other conditions being constant. Therefore, the coagulability of milk if condensed may be predicted from its coagulability in the uncondensed state. If it is required that the condensed milk be capable of withstanding sterilization at 233° F. for thirty minutes and the concentration of the inorganic salts is to be in the ratio of 2 to 1, the uncondensed milk will undergo the same coagulation if heated to 233° F. for sixty minutes, or the uncondensed sample could be subjected to a higher temperature for a shorter length of time, such that its coagulation in the uncondensed state will be the same as that which it would undergo in the condensed state. The fact that the tendency to coagulate in a given sample of milk follows the laws which permit of the prediction as to what the original milk will do after being condensed, permits of the selection or grading of milk and the utilization of only such milk as will withstand sterilization at the required temperature. Before accepting milk for use in the manufacture of humanized milk a sample from each can or each unit of the original milk may be subjected to the coagulation test and its coagulability determined and the coagulable milk eliminated before the milk is added to the mixture. Also, the batch or mixture of milk utilized may be kept at a uniform degree of coagulability.

The test for predicting the coagulability of milk as above referred to is known as the heat test. While various combinations of time and temperature may be used in this test, I have found that the following process gives satisfactory results. In order to select milk which will withstand sterilization above the death point of paraflectum faetida, or thirty minutes at a temperature of 233° F. in the condensed state, I subjected samples of approximately 2 ccs. each of the original units of fresh milk to a temperature of 278° F. for twenty minutes, placing the samples in open test tubes of resistance glass and placing the test tubes in an autoclave. A period of ten minutes is allowed for advancing the temperature of 278° F. The temperature is maintained at this point for twenty minutes and a period of ten minutes allowed for reducing the temperature from 278° to 212° F. Milk which is abnormal according to its ability or lack of ability to withstand sterilization, will coagulate in this treatment, while milk which contains only normal proteins will not coagulate.

The temperature and time of treatment in this test may be varied somewhat to suit changing conditions, as for instance, if it is necessary to use a slightly higher temperature than 233° F. for thirty minutes due to a greater resistance of the spore forming bacteria or to infection by some other kind of spore former of greater resistance.

One of the objects of my invention is to overcome the disadvantageous features just set forth, and generally speaking, the invention consists in the method by which the constituents of cows' milk are combined so as to produce permanent stability, and in the manner of recombining these constituents into the proportions of human milk. The invention consists of the processes finally claimed and in the products finally claimed, embodiments of which will hereinafter be described.

One practical embodiment of my process is carried out as follows:

A quantity of fresh milk sufficient for the capacity of the factory is obtained, and to a sample from each shipping can, a heat test as above described is applied. The milk found normal under the requirements of this test, is assembled, and known hereinafter as the batch. Any milk found abnormal according to this test is rejected, and only the strictly normal fresh milk retained for the manufacture of this product.

A portion, approximately one half of the fresh normal milk batch, is used for the manufacture of pure lactose, and from it also is obtained the cream required. The lactose is recovered from this portion after separating the cream, and purified by recrystallization and then made into a supersaturated syrup. This syrup is then put through a centrifugal clarifier or through a filter to remove any undissolved particles. It is then analyzed for per cent of lactose and retained for use in the process. The separated cream is pasteurized, cooled, analyzed for percentage of lactose, protein and fat, and retained for use in the process.

The other half of the batch of fresh normal milk is then condensed to approximately 33% to 36% of its original volume, namely, until stable emulsion between the colloid aggregate and serum takes place. It is then analyzed for total ash. It is then subjected to partial dialysis until the ash is reduced by from one tenth to two tenths of its original percentage. It is then again analyzed for fat, lactose, protein and ash. The proportion of lactose syrup and cream required to give the relative proportions in average human milk is then calculated. The calculated and weighted amounts of lactose syrup and cream are then mixed with the condensed milk having had its ash reduced, and the entire mixture is then homogenized. The accuracy of mixing is then checked by a complete analysis of the mixture, and the specific gravity of the colloids and of the serum are then determined as hereinbefore described. From the specific gravity of the serum and of the unfiltered milk, the specific gravity of the colloid aggregate (colloids and entangled fat) is calculated. In evaporated human milk, the serum is much heavier than in evaporated cows' milk, on account of the greater percentage of lactose. But, this difference of the specific gravities of the serum and colloids of human milk enables a calculation to be made as to the certain point of concentration where stability results. Applying this calculation to the specific gravity of the serum and colloids as above determined, I am enabled to determine a point of concentration for the milk in question where a state of balance suspension and stability will result. Consequently, a means is provided for making humanized milk which is stable, or of making slight changes in the ratio of fat to protein of it, which results in a point of stability at a desired concentration within a limited range of concentration. From this it follows, that in order to get stability in an artificial or modified milk, it is necessary to condense an artificial or modified milk to such a point that the specific gravity of the serum equals the specific gravity of the colloidal aggregate, and the density is determined by the composition of the milk. In order to test the accuracy of the first calculation of required density of the milk, I subject a sample after product of the condensing to the calculated point to ultrafiltration as hereinbefore described and again determine the specific gravities of the serum and of the colloid.

On account of the fact that cows' milk contains considerably more inorganic salts than human milk it is necessary to modify the inorganic salt content, that is, the ash content of the cows' milk, in order to make it the exact equivalent of human milk.

I have found it possible to selectively remove any desired proportion of the inorganic content of cows' milk by a process of partial dialysis, utilizing a membrane of certain porosity.

This process is based upon the principles of osmosis. Salts which are ionized in solution are known to exert a pressure in accordance with the gas laws. This pressure increases as the size of the ion decreases and if the solution of the salt is enclosed within a membrane having pores of such size that molecules of water and the ions can pass through the membranes, but the molecules of other substances being of larger size cannot pass therethrough, then the ions of the salt will force their way through the membrane if the membrane is immersed in pure water and will thus be removed from the original solution. This process is applicable to the removal of salts from the milk since the salts are ionized entirely or in part while the other constituents of the milk exist in molecules of much larger size, which are not ionized, consequently, when milk is placed in a cell made of a semi-permeable membrane of proper porosity and the cell is immersed in pure water, the inorganic salts of the milk will be caused to migrate through the membrane and into the water. If this cell is immersed for a sufficient length of time all of the salts will be removed from the milk, with the exception of those which are combined with proteins. By stopping the process at the requisite point any desired proportion of the inorganic salts may be selectively removed from the milk.

In a practical application of this process, after the removal of a portion of the inorganic salts from humanized milk, I have found that the desired result is obtained by using a completely gelatinized parchment paper or amyloid membrane. The membranes employed for the purpose are more completely gelatinized than the ordinary parchment paper. This renders the pores of smaller size and so prevents the loss of lactose from the milk, it being necessary to secure a porosity such that lactose will not appreciably pass through the membrane.

I have also succeeded in carrying out this process by using nitrocellulose membranes, securing the desired degree of porosity by mixing a small amount of glycerine with the collodion used in preparing the membranes. I have also been able to control the porosity of the membranes by properly controlling the drying of the collodion before immersion in water. A slight degree of drying produces a thicker and more porous membrane, while a greater degree of drying produces a denser and less porous membrane. Any membrane having such a porosity that lactose molecules will not readily pass, while the molecules of inorganic salts will pass, is suitable for the process.

In order to increase the rate of dialysis to such a point as to make the process practicable, I have found it to be desirable to circulate both the water and milk and instead of using sacks or cells of the ordinary type, as frequently employed in laboratory dialysis, I have constructed an apparatus similar in outward appearance to a filter press carrying a large number of membranes slightly spaced from each other. Through the alternate cells, milk is circulated and through the remaining cells the distilled water is circulated. This circulation has the effect of greatly increasing the rate of dialysis. I found that the area of the membrane required to carry out partial dialysis to the approximate point desired is 340 square centimeters per kilogram of milk to be dialyzed within a period of four hours. If it is permissible to use a longer time than four hours for the dialysis, the membrane area may be reduced in proportion to the increase in time. However, in practice, four hours is found to be a convenient length of time for the dialysis, and accordingly a membrane area is provided which will dialyze the required amount of milk within that length of time. The extent to which the dialysis is carried out is determined by the ash content of the milk, it being necessary to reduce the ash content to a certain fixed percentage corresponding to that found in average human milk. The extent of dialysis is not necessarily the same for all lots of cows' milk handled since the percent of ash varies from season to season and in different localities, but the extent of dialysis is readily determined by analysis.

Another embodiment of the process contemplates another procedure which leads to the same result. This is to first mix the calculated weight of lactose syrup and cream with the second portion of the batch of fresh normal milk, before condensing the milk, then condensing the mixture to the desired point, and then partially dialyzing the same, and then homogenizing it. The emulsion is then analyzed, so as to verify the accuracy of the mixing, and the accuracy of reaching the proper point of condensation. The specific gravity test described is, of course, applied in carrying out this embodiment.

By either of the embodiments described, a condensed milk product is produced, having the relative proportions of fat, protein, lactose and ash of average human milk, and of such concentration that the colloidal fat-protein entanglement will not separate from the serum. And the product has its constitutents in stable solution and suspension. The product has the relative proportions of fat-protein and lactose of human milk, and has its inorganic constituents or ash reduced by dialysis to approximately the proportion of average human milk.

Having secured the proper composition and other characteristics as described, the product is canned and sealed in either tin or glass containers and sterilized at suitable temperatures, then after being stored for a period of several days, the containers are inspected for leaks, and to some of the samples a "centrifugal" separation or "stability" test is applied, after which the product is ready to be marketed. This "stability" test is applied to the finished product as a means of inspection for determining whether it has any defect which would cause it to separate within a period of time such as a period of six months or one year. This test consists of centrifuging a sample of the finished milk at a high speed, so that within a period of time of less than one hour, it is subjected to a separative force equal to that which would be applied by gravity in a period of six months or one year, or such length of time as is selected as a maximum which it will be necessary for the milk to keep. But in general, milk which will withstand a test when applied equivalent to the action of gravity for six months, is in balanced suspension and will never separate, that is, in permanent and stable emulsion form. Thus, by this test, any product which is inaccurately combined may be detected at once.

The product made according to the above process retains, uninjured, the vitamines or growth producing components. The product is not subjected at any stage of the process to a temperature capable of injuring the vitamines that is, about 245° F., which temperature is known not to be injurious to vitamines in acid solution. Throughout the process, the normal acidity of fresh milk is retained. The care used in selecting normal fresh milk makes possible sterilization without neutralization of any of the normal acidity of the milk. The addition of lime water or any other alkali as heretofore generally used in preparation of humanized milk, is rendered unnecessary, since the milk has no increased acidity due to souring, and as it is in fresh normal condition will withstand sterilization in the presence of its natural acidity. This is a very important feature, since it is well-known that vitamines are destroyed if held in the presence of an alkali for a sufficient time, or are destroyed at once if heated in the presence of an alkali. Furthermore, no constitutent not a normal constituent of milk is added. Milk does not normally contain any alkali, or any compound such as formed by the neutralization of an alkali, and the addition of any such foreign substance as has heretofore been done in the effort to make the product resistant to sterilization, is harmful. Tests made by suitable feeding experiments have shown that the vitamines of this product are uninjured and not reduced.

I have found that very slight changes in the relative proportion of fat to protein affects the specific gravity of the colloidal aggregate, and consequently affects the point of condensation at which the compound reaches a condition of stable suspension. In case the point of condensation of a batch of milk where stability is reached is found to be too low or too high, slight additions of fat or of whole milk may be made without materially affecting the analysis of the product, so as to give the colloidal aggregate such a specific gravity that it will be in stable suspension at a suitable concentration. Average human milk has the composition, fat 3.78%, protein 2.29%, lactose 6.21% and ash 0.31%, although individual samples may vary considerably from these averages. It is the purpose of the process herein described to make an artificial human milk having the components in the same relative proportions as the average of human milk, and of a concentration approximately twice the above percentages, so that for use, the product will have to be diluted. On account of the fact that the specific gravity of butter fat and of protein of milk vary appreciably from season to season, changes of a few hundredths of a per cent in the relative proportions of fat and protein are necessary in order to make the colloidal aggregate have a uniform specific gravity and consequently come to a condition of stable equilibrium in respect to the serum at a certain concentration. These changes in the percentage of protein and fat are, however, less than those which naturally occur in human milk from time to time, so that this product is practically constant in its composition as compared to natural human milk. I have described several embodiments of the process, but changes may be made without departing from the spirit of the invention as defined in the appended claims. The product itself has been described and is also hereinafter claimed.

I claim:

1. The process of making a condensed modified milk which consists in concentrating whole milk then adding lactose and cream to bring the cows' milk to the relative proportion of the constituents of human milk, then dialyzing to partially reduce the ash content to the relative proportion of human milk, homogenizing the same, and then diluting with water to such density that the specific gravity of the serum equals that of the colloidal aggregate.

2. The process of making a condensed modified milk which consists in concentrating whole milk, then adding lactose and cream to bring the cows' milk to the relative proportion of the constituents of human milk, homogenizing the same and then diluting with water to such density that the specific gravity of the serum equals that of the colloidal aggregate.

3. The process of making a condensed modified milk which consists in condensing modified dialyzed cows' milk to a point of stable suspension in which the colloidal aggregate and the serum of the milk are in substantial equilibrium, homogenizing and then sterilizing the same.

4. The process of making a modified milk which consists in recovering from one portion of fresh normal cows' milk the pure lactose and cream, condensing the other portion to a point approximately 33% of its original volume, dialyzing the condensed portion to reduce the ash content of the condensate, adding the pure lactose and cream of the first portion to the dialyzed condensate and adding a quantity of water, sufficient to reduce the milk to the degree of density where the specific gravity of the serum equals the specific gravity of the colloidal aggregate and homogenizing the mixture.

5. The process of making a modified milk which consists in recovering from one portion of fresh normal cows' milk, the pure lactose and cream adding the pure lactose and cream to the other portion of the fresh normal cows' milk, condensing the mixture until the colloidal aggregate is in stable suspension in the serum, dialyzing the condensate and homogenizing the dialyzed condensate.

6. In the art of making modified milk the steps which consist in subjecting sample portions of cows' milk to the influence of heat sufficient to coagulate abnormal coagulable proteins, then selecting only that milk in which the protein does not coagulate, and finally converting the selected milk into condensed humanized milk of a composition equivalent to that of average human milk of equal density.

7. In the art of making modified milk, the step which consists in subjecting a sample of a body of milk to ultrafiltration to separate the milk directly into its colloidal and non-colloidal constituents to enable the specific gravity of the colloidal constitutents of the milk to be calculated and then concentrating the milk until the specific gravity of the serum is substantially equal to the specific gravity of the colloidal constituents.

8. A condensed modified cows' milk, having substantially the same relative proportions of fat, protein, lactose and ash as average human milk and in which the inorganic constituents are present in substantially the same proportion as in average human milk.

9. A modified milk product having the relative proportions of fat, protein and lactose of human milk, condensed and sterilized, and in which the colloidal aggregate and the serum are of substantially the same specific gravity so as to form a stable suspension of the colloidal aggregate in the serum.

10. The process of making a condensed milk which consists in condensing milk having substantially the same relative proportion of fat, protein and lactose as human milk to a point of stable suspension in which the colloidal aggregate and the serum of the milk are in substantial equilibrium, homogenizing and then sterilizing the same.

In testimony that I claim the foregoing as my invention, I have signed by name.

GEORGE GRINDROD.